Feb. 12, 1963 C. W. COCHRAN 3,077,019
FASTENING DEVICE
Filed Sept. 26, 1960
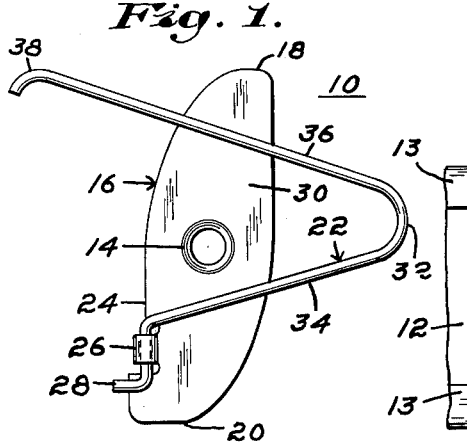
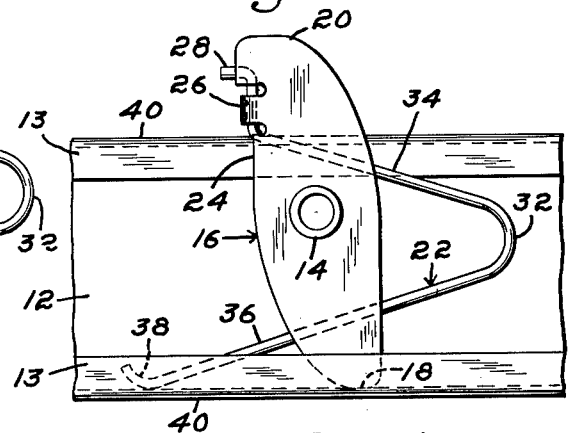
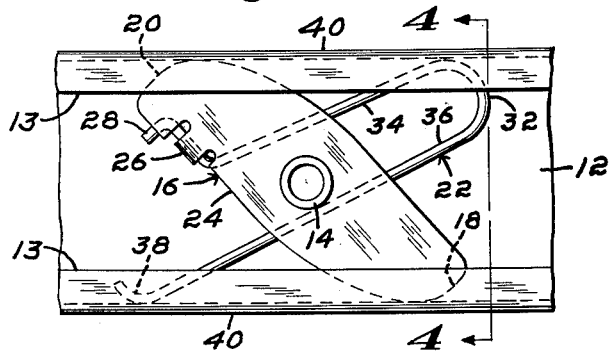
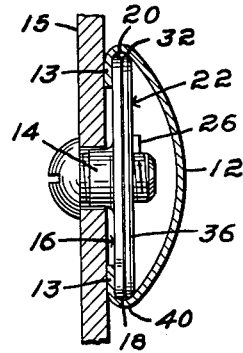
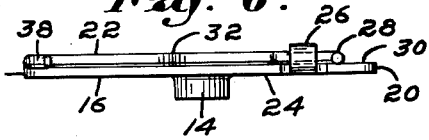
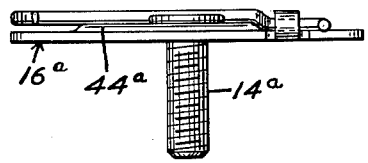
Inventor:
Clarence W. Cochran, (deceased),
by Lois Cochran, Administratrix
by James B. Tyyany Jr. Atty.

3,077,019
FASTENING DEVICE

Clarence W. Cochran, deceased, late of Belmont, Mass., by Lois Cochran, administratrix, Belmont, Mass., assignor to United-Carr Fastener Corporation, Cambridge, Mass., a corporation of Delaware
Filed Sept. 26, 1960, Ser. No. 60,245
2 Claims. (Cl. 24—73)

This invention relates generally to fastening devices and in particular to that type of a fastener known as a wire finger molding fastener adapted to attach channel moldings or the like to a support.

Various types of wire finger molding fasteners are now in use in the automotive industry, all of which create a certain amount of binding action when being adjusted in the molding to align the fastener with the body. This has proved to be the case with the use of new and softer materials used in the manufacture of the trim, particularly aluminum.

The object of this invention therefore, is to provide an improved molding fastener adapted to be easily adjusted within the molding to facilitate alignment with an apertured support.

A further object of this invention is to provide a molding fastener in which the tensioning arm has a larger degree of flexibility and lies within the range of the plate area.

Other objects of the invention will, in part, be obvious, and will, in part, appear hereinafter.

In the drawing:

FIG. 1 is a top plan view of the molding fastener;

FIG. 2 is a bottom plan view of the fastener illustrating the method of insertion within a molding;

FIG. 3 is a bottom plan view of the fastener fully inserted within a molding;

FIG. 4 is a view in section taken on line 4—4 of FIG. 3;

FIG. 5 is an end view of the fastener;

FIG. 6 is a view in side elevation of the fastener; and

FIG. 7 is a view in side elevation of a modified form of the fastener.

Referring to the drawings, there is illustrated a fastener 10 for insertion within a channeled molding 12 with spaced inwardly directed flanges 13 and securing means 14 positioned on the medial lateral portion to attach the fastener to a support 15.

The fastener 10 comprises a plate 16 of a length greater than its width having the opposed ends 18 and 20 rounded to eliminate any biting corners. A tensioning spring 22 is assembled to one edge 24 of the plate 16 by means of a tab member 26 struck out of the edge and curled around the secured end 28 of the arm 22. The spring 22 extends from the tab member 26 obliquely across one face 30 of the plate 16 but spaced therefrom, terminating in a bight portion 32 which redirects the spring 22 back across the face 30 so as to define a pair of arm members 34 and 36 spaced on either side of the securing means 14, the free end 38 of the spring 22 is curled in the direction of the secured end 28 so as to present a non-biting bearing surface for sliding engagement with the interior of the inwardly directed flange 13 and is laterally spaced from the edge 24 and transversely spaced from the secured end 28.

To assemble the fastener with the molding, the arm member 36 and the end 18 of the plate 16 are inserted within one of the flanges 13 so that the free end 38 bears against the curve 40 of the flange 13 and the rounded end 18 is laterally spaced therefrom as illustrated in FIG. 2. The arm 34 is then compressed in the direction of the arm 36 by pressure being applied to the end 20 causing the end 18 to slide along the curve 40 of the flange until the end 20 and the bight 32 lie within the confines of the opposed portion of the flange 13. The tension is then released and due to the resilient characteristics and dimensions of the spring 22, the fastener is retained in engagement by a four point bearing. It will readily be seen that since all four of the bearing points, the two rounded ends 18 and 20 of the plate 16, the bight 32 and the free end 38 of the arm 36 are rounded, the fastener may be laterally moved smoothly and readily within the confines of the flanges 13 to align with fastening means on the exterior of the automotive body or support 15.

FIG. 7 illustrates a modified form of the invention showing a bolt member 14a staked or attached to the plate 16a as a variation of the securing means 14 as shown in FIGS. 1–6 with plate having an embossed portion 44a for strength.

Since certain other obvious modifications may be made in this device without departing from the scope of the invention, it is intended that all matter contained herein be interpreted in an illustrative and not in a limiting sense.

I claim:

1. A molding fastener device for mounting within a hollow trim molding having opposed inturned flanges, said fastener device having an elongated plate provided with opposed ends for engagement with the flanges of a molding, an attaching member presented by the elongated plate and a loop-shaped resilient tensioning spring member having one end only secured to said elongated plate and having a pair of arms extending over said elongated plate in a direction generally crosswise to the long diameter of said elongated plate and connected by a bight portion and the other end of the spring member shaped to provide a molding engaging free end to maintain the elongated plate in engagement with a molding, said bight portion and a portion of each arm extending laterally beyond one side of said elongated plate portion and a portion of one arm and the molding engaging free end thereof extending laterally beyond an opposite side of the elongated plate whereby said opposed ends of said elongated plate, said bight portion and said free end of the looped-shaped resilient tensioning member together provide four molding engaging portions.

2. A molding fastener device for mounting within a hollow trim molding having opposed in-turned flanges, said fastening device having a single elongated plate provided with opposed ends for engagement with the flanges of said molding, an attaching member presented by the single elongated plate, and a loop-shaped resilient tension spring member formed of a unitary piece of wire having one end only secured to said single elongated plate and said spring member having a pair of arms extending over said single elongated plate in a direction generally crosswise to the long diameter of said single elongated plate, and connected by a bight portion and the other end of said spring member shaped to provide a molding engaging free end to maintain said single elongated plate in engagement with said molding and said bight portion providing a means for engaging an in-turned flange of said molding.

References Cited in the file of this patent

UNITED STATES PATENTS

| | | |
|---|---|---|
| 2,713,186 | Borowsky | July 19, 1955 |
| 2,725,609 | Ross | Dec. 6, 1955 |
| 2,879,569 | Poupitch | Mar. 1, 1959 |